UNITED STATES PATENT OFFICE 2,591,691

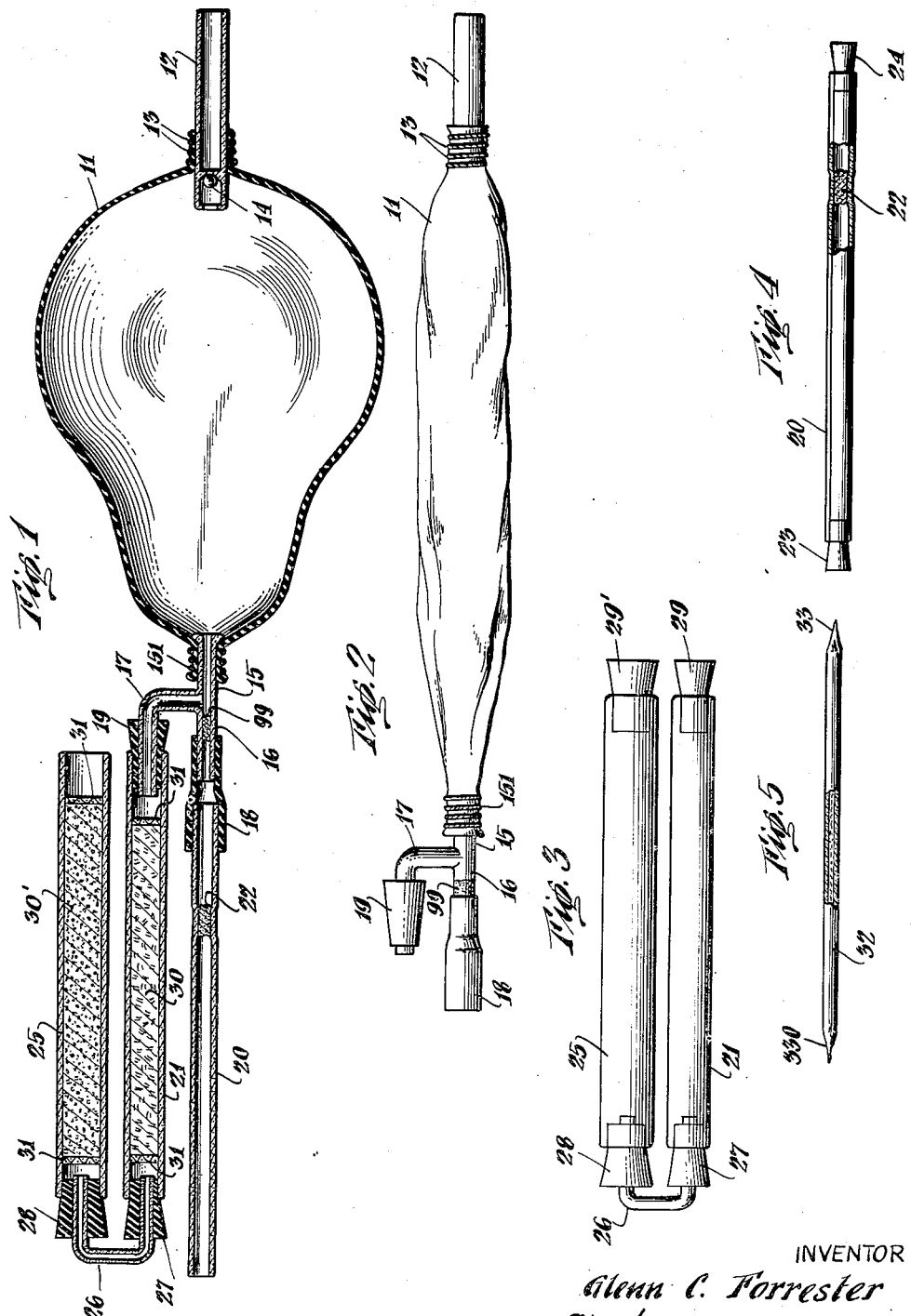

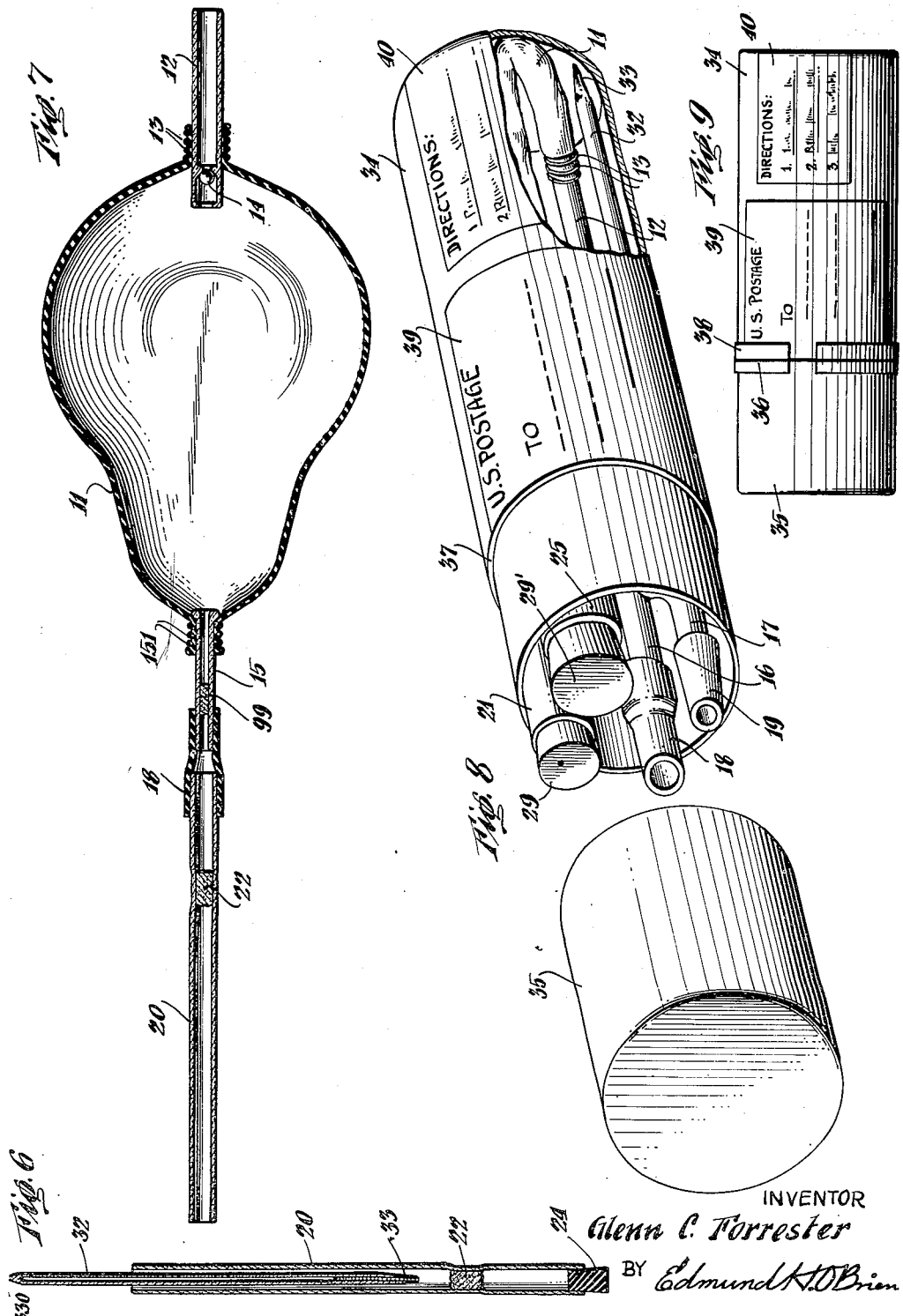

METHOD FOR DETERMINING BREATH ALCOHOL CONTENT

Glenn C. Forrester, Niagara Falls, N. Y.

Application July 5, 1946, Serial No. 681,531

2 Claims. (Cl. 23—232)

This invention relates to an improved method, and to apparatus especially designed for carrying out that method, for inquiring into the condition of a person for the purpose of determining his degree of intoxication, if any, as revealed by the alcohol content of his blood.

It is especially concerned with an improved method and apparatus for securing definite chemical evidence establishing intoxication, if any. It provides a compact, accurate, and efficient apparatus for determining the alcohol to carbon dioxide ratio in air expired by the person whose condition is being examined, and a simple and precise method for determining this ratio. The alcohol to carbon dioxide ratio in the expired air, in accordance with my improved procedure and known physical relationships, is readily converted to what is the usual and accepted medical measure of degree of intoxication, i. e. the alcohol concentration in the blood of the patient.

The desirability in medicolegal cases of having objective chemical evidence to supplement impressions gained from the odor of the breath, or from the behavior, of a person suspected of being intoxicated is obvious. Such evidence is especially desirable in motor vehicle cases where an accused is charged with driving while under the influence of alcohol. My invention provides a simple apparatus for measuring the alcohol-carbon dioxide ratio in the accused's breath, from which ratio the alcohol content of the blood, and the degree of intoxication, are readily determined, which apparatus can be used, without difficulty by any ordinary police official or law enforcement officer without specialized training. In addition to permitting accurate measurement of the alcohol and carbon dioxide content of a volume of air expired by the accused, my improved apparatus is also provided with a visual indicator from which the approximate alcohol content in the blood of the accused may be obtained immediately, merely by observation of the number of seconds required for decolorization of a colored solution and reference to a table. In this way the police officer may quickly determine from the visual test whether the probable degree of intoxication of the accused warrants completion of the test and transmittal of the testing apparatus to the chemical laboratory for precise determination of the alcohol to carbon dioxide ratio.

While devices by which the alcohol to carbon dioxide ratio of expired air is determined and used as a measure of alcohol concentration in the bloodstream, as distinguished from those devices in which the alcohol concentration is directly measured by withdrawing a sample of blood from the accused, have previously been available, none has been practical for use in the field for on-the-spot determinations. With previously available devices the suspect has had to be transported to a headquarters or a station, often many miles distant, for testing by an operator especially skilled in the use of these intricate, cumbersome and fragile devices. The usual law enforcement officer is not sufficiently skilled to operate presently available devices himself. Moreover, other duties have frequently prevented the prompt transportation of the accused person to such a testing station. Especially when present at the scene of a traffic accident, the first duty of the police officer is to care for the injured, clear the highway, get traffic moving, and only then may he turn his attention to getting the accused to the station for testing. Frequently hours may elapse in these operations, and the results of the examination, when finally taken, are not at all representative of the suspect's condition at the time of the accident or offense.

While it is essential that all offenders be apprehended and detained, it is also highly desirable, from the standpoint of justice, that suspects who are, in fact, non-offenders be subjected to a minimum of detention and inconvenience. It is also equally desirable from the standpoint of the police officer that he run no danger of making a false arrest. Present devices provide no quick on-the-spot indication of the alcohol content of the suspect's blood. A complicated testing procedure at a distant point and after some delay is necessary before securing any definite idea whatever as to the suspect's degree of intoxication. While a vigilant police officer would want to test all persons involved who might smell of alcohol, it is evident that actual intoxication might be present in but relatively few of the cases. Because of the foregoing limitations the devices now available are impractical in that they permit a precise and definite answer on the subject of the accused's intoxication only by detaining each suspect, transporting him to the nearest station, and providing at all times a trained operator who will subject the accused to the complete test.

My improved apparatus eliminates these difficulties in that it is simple, inexpensive, and light in construction, and so compact as to be readily fitted into a cylindrical mailing tube approximately two inches in diameter and eight inches long. Packed in such a kit, it may be readily carried in the pocket of a traffic officer, and may be furnished to him in a completely sealed container for use in testing the breath of an accused person. When it is to be used the cap is removed to expose the device, which is then applied in the visual testing of the person's breath sample, followed, if desirable, by using the remaining breath sample for the accurate alcohol-carbon dioxide determination. The telescoping cap may then be replaced, the container resealed, and mailed back to the laboratory for accurate measurement of the alcohol and carbon dioxide contents in the breath sample tested. However, use of the device for securing the accurate determination of the alcohol to carbon dioxide ratio is necessary only in those cases where the visual test indicates, by the approximate result obtained visually, that there is a sufficiently high degree of probability that the accused is intoxicated.

The elimination of useless measurement in those instances wherein the alcohol to carbon dioxide ratio is clearly so low as to be of no value in establishing intoxication is an important and distinct advantage of my improved apparatus. Moreover, the actual testing of the accused requires only a few minutes and demands no more cooperation of him than that he blow a sample of his breath into a rubber balloon. While my improved apparatus is efficient and accurate in measuring the alcohol-carbon dioxide ratio of the breath, its use requires no special skill or technical training on the part of the police officer. All the officer needs do is follow simple directions.

The attainment of the foregoing advantages in a breath alcohol apparatus, or "intoximeter" of this general type, useful in determining the degree of intoxication of human beings, is made possible by the improved apparatus herein described.

Before describing my new and improved method and apparatus for both visually and quantitatively determining the degree of intoxication, it may first be advantageous briefly to describe the physical and chemical relationships upon which the success of my method depends.

The fact that the alcohol to carbon dioxide ratio in the breath may be used to determine the concentration of alcohol in the blood is now well understood by physicians and criminologists. According to Henry's law, the concentration of alcohol vapor in alveolar air is in proportion to the concentration of alcohol in the pulmonary blood. Alveolar air in the lungs in contact with aqueous alcohol in the bloodstream absorbs a definite quantity of alcohol, and a fixed ratio, called the partition ratio, exists between the concentration of alcohol in the air and that in the aqueous solution. The fact that the carbon dioxide content of alveolar air is constant in the normal adult has also been known for some time. Carbon dioxide constitutes approximately 5.5 per cent by volume of the alveolar air, approximately 100 milligrams per liter, and it exerts a partial pressure equal to the carbon dioxide tension in the pulmonary blood. It is evident that these relationships permit determination of the amount of alveolar air in a given sample of expired air by measuring the carbon dioxide content of the sample. Since the tendency of carbon dioxide to escape from the blood and other body fluids or surfaces may be taken as constant, it is evident that the quantity of alcohol which accompanies the carbon dioxide should vary in direct proportion to the concentration of alcohol in the blood.

The accurate determination of the percentage of alcohol in the blood with my improved apparatus, employing the principles outlined above, depends on the accurate measurement of the alcohol and carbon dioxide contents of exhaled alveolar air. The alcohol (and moisture) present in the patient's breath are first absorbed in a chemical absorbing agent, and the carbon dioxide content in the sample of expired air then absorbed in a suitable absorbent. The absorbed alcohol can then be distilled out of the first chemical absorbing agent, condensed, and its amount determined. The increase in weight of the carbon dioxide absorbing agent is a measure of the carbon dioxide content of the air sample tested. The ratio of alcohol to carbon dioxide, by weight, in the sample of alveolar air from the patient's lungs may then be readily computed. Since this is proportional to the alcohol concentration in the blood, it is apparent that one may be computed from the other. A convenient relationship for determining the percentage of alcohol in the blood from the alcohol to carbon dioxide ratio is as follows:

Per cent of alcohol in the blood =

$$0.2 \times \frac{\text{milligrams of alcohol}}{\text{milligrams of carbon dioxide}}$$

Alveolar air, or air from the lungs, is exhaled by a person only after the air present in the windpipe and upper passages is exhaled. In a given sample of air exhaled by a person into the balloon of my improved testing apparatus, experiments have shown that the percentage of alveolar air, or true breath may vary from 60 per cent to 100 per cent. In the visual test for quickly determining the approximate alcohol content in the blood which my apparatus permits and which is now to be described, the results are based upon an average, approximate content of 80 per cent alveolar air in any sample of air exhaled by the person undergoing the test.

My visual method for determining the approximate blood alcohol content is based on the period of time required for the alcohol present in a sample of breath to decolorize a standard oxidizing solution when the breath sample is blown through the solution. In using my apparatus the first air leaving the balloon into which the person undergoing the test has blown his breath is passed through the colored solution, and the police office, or other person making the test, notes the time in seconds needed for its complete decolorization. If this time is sufficiently short to indicate that the accused is probably intoxicated the remainder of the air is then allowed to pass into the first absorbing chamber, where alcohol and water are absorbed, and from there into the second, or carbon dioxide absorbing, tube or chamber. On the other hand, if the time required to effect decolorization of the colored solution is so long as to indicate little or not appreciable intoxication, there is no need for the police officer to carry out the absorption part of the test.

The standard colored oxidizing solution which I prefer to use is an acid solution of a colored permanganate, preferably potassium permanganate, of a standard concentration. I have secured good results with a solution of potassium permanganate in sulfuric acid having a specific gravity of approximately 1.24 and having a permanganate concentration equivalent to 0.02 N.

The colored oxidizing solution is prepared immediately prior to the test, since such a solution will deteriorate on standing for more than a few hours. As will be apparent from the detailed disclosure of a preferred form of apparatus embodying my invention which follows, I prefer to add, just prior to use of the device in testing a person's breath, a standard amount of a standard solution of potassium permanganate to a definite amount of sulfuric acid of known concentration, this acid being preferably stored or retained in a fritted glass reservoir of porous character through which the patient's breath is passed when the apparatus is in use. The respective amounts of permanganate solution and acid, and their concentrations, are such that when the permanganate solution is added to the acid in the fritted glass reservoir just prior to using the apparatus, an acidic solution of potassium permanganate having the required specific gravity, 1.24, is secured.

As the air containing the alcohol is passed through the acidified potassium permanganate solution, preferably absorbed and held in the porous fritted glass reservoir element of my apparatus, the alcohol is oxidized by the permanganate and the permanganate thus decolorized. The time in seconds required for the destruction of the purple (or orchid) color of the solution, i. e. the rate of oxidation, is a measure of the concentration of alcohol in the exhaled breath. A chart is furnished with the apparatus which contains data premitting converting the time required for decolorization to approximate concentration of alcohol in the bloodstream. When testing a breath sample, if the law enforcement officer sees that the potassium permanganate solution is decolorized sufficiently rapidly to indicate probable intoxication, he can permit the remainder of the exhaled air sample in the balloon to pass through the train of chemical absorbents, and thus secure, after laboratory measurements have been made, an accurate determination of the alcohol content of the blood.

The operation of the visual determination test, and certain precautions to be observed in carrying it out, can be more advantageously explained in greater detail subsequently, after a suitable form of apparatus has been described.

Apparatus in a preferred embodiment designed to attain the foregoing aims and objectives of my invention, and to permit the law enforcement officer or other testing official to secure, simultaneously, both an immediate approximate value, and an accurate later determination by chemical means, of the degree of intoxication, is illustrated in the accompanying drawing. In this drawing:

Fig. 1 is a sectional view, the chemical absorbent layers and fritted glass reservoir being illustrated in elevation, of my complete apparatus as assembled for use by the official making the test;

Fig. 2 is a view, in elevation, of the expansible balloon for receiving the breath to be tested, this view also showing the attached mouthpiece and connecting two-way conduit, one tube of which leads to the visual apparatus for rapid determination of approximate blood alcohol content, and the other tube of which leads to the chemical absorbent chambers wherein the alcohol, moisture, and carbon dioxide present in the breath sample are absorbed. The balloon is shown in the collapsed condition.

Fig. 3 is a detail view, in elevation, of the tubes containing the chemical absorbent agents, these tubes being closed by stoppers, corks, or other closure elements to prevent deterioration of the chemical, as they appear before the device is assembled for use;

Fig. 4 is a detail view of the tube used for determining the blood alcohol content by visual observation of the time required to decolorize a standard solution. The fritted glass reservoir in which the sulfuric acid is retained, and which serves to absorb the permanganate solution when it is applied thereto, is shown in elevation;

Fig. 5 is an elevational view, a portion thereof being shown in section, of the capillary glass tube by which the potassium permanganate solution is applied to the fritted glass porous reservoir when the device is being assembled for use in making a test;

Fig. 6 is a sectional view of the visual indicator tube with the capillary glass tube introduced thereinto. This figure shows how the permanganate solution is applied to the fritted glass reservoir of the visual observation tube used, by observing the time required to decolorize the standard oxidizing solution, to secure an immediate approximate value for the alcohol content of the patient's blood;

Fig. 7 is a sectional view, some parts being shown in elevation, of a modified form of my apparatus, as used under those circumstances wherein the approximate value for the alcohol content of the blood, as determined by observing the time needed to decolorize the standard solution, is all that is desired;

Fig. 8 is a schematic view of the complete apparatus as packed into a cylindrical mailing tube, the cover of the mailing tube being removed, and portions of the tube cut away, to show how the apparatus is packed in the tube; and Fig. 9 is a view in elevation of the mailing tube, showing the cover sealed in place, the string which is to be pulled for the purpose of breaking the seal, the label for mailing, and the directions for using the device. These directions may advantageously be printed on a label, which is then glued, in place, on the mailing tube.

Referring more particularly to Figures 1 to 4 inclusive, my complete device includes the expansible rubber balloon 11 designed to have, when expanded, a capacity of at least three liters. This rubber balloon is provided with mouthpiece 12 through which the patient blows his breath into the balloon, the balloon being secured to the mouthpiece by some retaining means, such as by the wrapping wire 13 illustrated. The mouthpiece is provided with a check valve 14 to prevent the escape of air from the filled balloon through the mouthpiece. It may comprise, as illustrated, a ball check valve of usual type, or any other convenient form of check valve, such as one including a sleeve of thin flexible rubber, may of course also be utilized.

The outlet end of the rubber balloon 11 is provided with outlet tube 15, of brass or some other convenient material, which is secured to the balloon by any convenient means, such as the wrapped wire 151. The outlet tube 15 is branched to provide branches 16 and 17, one leading to the visual determination tube, and the other to the chemical absorbent chambers, both as subsequently described. The bore of outlet tube 15 is made ample to permit rapid discharge of the contents of the balloon. As shown, the branched tubes 16 and 17 are, respectively, provided with flexible tubing 18, which is relatively inert and impervious to the escape of gases, and with stopper or cork 19. Tube 16 fits snugly into one end of the flexible tubing 18, and tube 17 extends through a hole in the stopper 19. Tubing 18 and 17 are designed, respectively, to lead to the visual determination tube, and to the first chemical absorbent tube 21, when the apparatus is assembled for use in making a test.

The visual determination tube 20, shown in detail in Fig. 4, is provided approximately midway of its length with a fritted glass reservoir 22. The frit is made by fitting tube 20 with a flat plug of asbestos fluff tamped firmly enough to support the total weight. 0.55 gram of Pyrex grit of 20–25 or 25–30 mesh is weighed into the tube and it is suspended on a stainless steel rod set in a ceramic block. It is heated to 800° C. in about an hour, and allowed to cool slowly. Later the asbestos is removed, the wall of the tube around the frit heated in an oxygen flame to softening, and drawn down on the frit by suction and then annealed. This results in a porous glass reservoir which is not only porous and will retain the sulfuric acid designed to be retained therein, but which is also resistant to the acid. Its porous character permits the passage therethrough of the air stream, the alcohol-containing breath, from the balloon. As previously explained, this porous glass reservoir of fritted glass 22 is charged with the aqueous sulfuric acid solution at the factory or reconditioning laboratory when the device is packed for use. To prevent any change in composition or specific gravity of this acid by evaporatioan of its water content or absorption of moisture from the air the visual determination tube, as packed in the mailing tube, is sealed at each end with the suitable cork or rubber stoppers 23 and 24. When the device is assembled for use the stopper 23 is removed, and the potassium permanganate solution caused to flow, by blowing on the upper end of the tube if necesary, from the capillary tube shown in Fig. 5 into the fritted glass reservoir 22 as shown in Fig. 6, and stopper 23 then replaced. Stopper 24 is then removed and this end of the visual indicator tube, now ready for use, is slipped into the open end of the flexible tubing 18, which closely fits it, thereby providing an effective seal. Rate of flow through the visual determination tube 20 is regulated by the porosity built into the fritted glass reservoir 22.

The chemical absorbent tubes 21 and 25 are connected by the tubing 26 at one end, this tubing being adapted to fit into apertures formed in the rubber or cork stoppers 27 and 28, which stoppers fit into the ends of these tubes. When the device is in use flow through the chemical absorption train is regulated by selection of capillary size of tubing 26. When the chemical absorbent tubes are packed with the absorbing material, and placed in the kit or mailing carton at the factory for shipment to the user, the open ends of the tubes 21 and 25 are sealed by the stoppers 29 and 29' (Fig. 3). When the device is assembled for use, as shown in Fig. 1, stopper or cork 29 is removed, and the inlet end of tube 21 placed in communication with branched outlet tube 17 from the rubber balloon 11 by inserting the stopper 19 carrying this branched tube into the open end of the tube 21.

The internal construction of the chemical absorbent tubes 21 and 25, which may be formed of glass or other suitable material, is best shown in Fig. 1. Each tube includes a layer or mass of chemical absorbent, 30 and 30', held in the tube between spacers 31, which may be glass wool plugs, pierced porcelain or glass discs, or other inert porous retaining members. The first tube of the chemical train, tube 21, contains an absorbent for the moisture and alcohol present in the breath sample passing through the tube. Although various chemical absorbing agents might be used for this purpose, I prefer to employ, as the absorbent 30 for alcohol and water, 4 grams of dehydrated magnesium perchlorate crystals. The use of anhydrous magnesium perchlorate to absorb or remove certain organic vapors, including alcohol, from gaseous media is disclosed and claimed in my Patent No. 2,049,608. It should be emphasized that it is important that the layer of absorbent 30 absorb not only the ethyl alcohol in the breath sample, but also the moisture, before the breath sample passes through the absorbent 30' in the tube 25, the carbon dioxide absorbent layer. Otherwise the water might be absorbed in absorbent 30', and thus introduce inaccuracy into the determinations.

The carbon dioxide absorbing layer 30' may be any one of a number of known chemical agents which absorb carbon dioxide. For example, soda lime may be used, but I have secured best results with 12 grams of a special preparation known as "Ascarite." This consists of caustic soda fused on asbestos, which has been granulated and screened to size. It is a rapid and convenient agent which is widely used for the quantitative absorption of carbon dioxide. It will also absorb moisture, hence the necessity for providing enough chemical absorbent in tube 21 to absorb not only the ethyl alcohol present in the breath sample, but also all the moisture.

Figures 5 and 6 show the standard solution of potassium permanganate in the capillary tube 32, and the manner in which it is poured into the porous fritted glass reservoir 22 of the visual determination tube 20 when the apparatus is being assembled for use. The capillary tube 32 is provided with pointed ends 33 and 330, which are broken off, and the solution caused to run from the capillary tube into the fritted glass reservoir 22, as shown in Fig. 6. Stopper 24 is then removed, and the tube 20 inserted in the flexible tubing 18, as shown in Fig. 1, when the apparatus is being assembled for the test.

In using the assembled apparatus, the patient or accused blows his breath through the mouthpiece 12 into the rubber balloon 11. Care is taken to secure a fairly large volume of air, three liters or so if possible, in order to make sure of getting a sample which is predominantly alveolar air and adequate to complete the color test undertaken. During this time the stoppers 23 closing tube 20, and 29' closing the tube 25 and the chemical absorbent train, should be left in place. The law enforcement officer then takes the apparatus with the filled balloon 11, holds it in a vertical position, the outlet end of tube 20 pointing upwardly, removes the stopper 23 from the end of this tube, and notes the time in seconds required for the colored solution in the fritted glass reservoir 22 to become decolorized. This time depends on the concentration of alcohol in the air sample (not on the total amount of alcohol). If the person is intoxicated, only a short time, and only a small part of the air in the balloon, are required for decolorization. If this time is sufficiently short to indicate the desirability of getting an accurate determination of the alcohol to carbon dioxide ratio, the law enforcement officer replaces the stopper 23 in the outlet end of tube 20, withdraws the stopper 29' at the outlet end of the chemical absorbent train, and allows the rest of the air in the rubber balloon 11 to pass through the chemical absorbent tubes 21 and 25. It is desirable that about two liters or more of air be available for this purpose. If there is insufficient air left in balloon 11 to supply an approximate two minute flow or more (balloon 11 and tube 26 being adjusted to permit flow of approximately one liter per minute) an additional sample should be secured from the patient or accused and caused to flow thru the absorbent train. When all the air has passed through the apparatus the chemical train tubes 21 and 25, as a unit, are dismantled, stoppers 29 and 29' replaced, the balloon assembly and the visual determination tube replaced in the kit which is then recapped and sealed for transmittal to the chemical laboratory making the accurate determination. At the laboratory the magnesium perchlorate is dissolved in water, and the alcohol content distilled out, collected, and determined by usual methods. The carbon dioxide content of the breath sample is determined by weighing tube 25 and contents. Its increase in weight gives the carbon dioxide content of the air sample. The ratio, milligrams of alcohol to milligrams of carbon dioxide, is readily determined. As pointed out above, this ratio is proportional to the percentage of alcohol in the accused's blood.

In some instances it may not be necessary to have an accurate determination of the alcohol to carbon dioxide ratio, and the approximate value given by the visual test may be entirely sufficient. In this case the alternative form of apparatus shown in Fig. 7 may be use. This form includes the balloon 11, the mouthpiece 12, and the ball check valve 14, but the tube 15, instead of being branched, is merely a straight conduit leading to the visual determination tube 20, which is held in communication with the balloon and outlet tube 15 by the closely fitting piece of flexible tubing 18. The use of this form of apparatus is the same as that described in connection with Fig. 1, except, of course, that the test is complete when the colored oxidizing solution in the fritted glass reservoir 22 has been decolorized.

A suitable mailing carton or kit for shipping or mailing the device (when disassembled) from the factory, or back to the factory for accurate chemical determination of the alcohol to carbon dioxide ratio, is shown in Figures 8 and 9. Fig. 8 illustrates the manner in which the apparatus is packed into the mailing carton 34, which is provided with tightly fitting, telescoping cover 35. When this cover is in place a string 36 may be positioned between cover 35 and lip 37 of the carton. When this string is pulled it serves to break apart the strip of sealing paper or cloth 38, which may be placed over the line of contact of cover and carton when sealing the mailing carton preparatory to shipping or mailing. A label 39, glued to the box, may serve to record the mailing address, and directions for using the intoximeter may be printed on the separate label 40.

Keeping in mind my apparatus for inquiring into a person's degree of intoxication, if any, it is now possible to explain in greater detail the factors involved in the visual determination test. Previous methods wherein a solution of a permanganate has been employed to oxidize alcohol vapors have depended on the complete oxidation of all the alcohol vapors present in the breath sample. For this purpose strongly acid (with $H_2SO_4$) solutions of potassium permanganate have been employed, solutions of specific gravity 1.30 and above having been suggested. The methods previously proposed employing strong solutions of the oxidizing agent in order to insure complete oxidation of all alcohol present in the breath sample, have had two serious disadvantages. First it has been necessary to mix the oxidizing solutions in the field; and, secondly, these methods have necessitated accurate measurement of the volume of the breath sample being examined. These objections have eliminated previously available methods for practical use in field operations.

My improved visual determination method depends on the established fact that it is possible to measure a time interval more accurately and more conveniently than the volume of a breath sample. In my method a weakly acidic solution of a permanganate is exposed to the breath sample containing the alcohol. The time required to decolorize the permanganate solution varies inversely with the concentration of alcohol in the sample of breath. In order to secure consistent and representative results certain conditions must be maintained while the test is in progress. These necessary conditions will now be considered.

The strength of the acid and the concentration of the permanganate solution must both be definite and constant. Moreover, the alcoholic content of the breath sample while in contact with the oxidizing reagent must be maintained at or near its true value. This is necessary because the rate of decolorization of the reagent depends on, and measures, the breath alcohol concentration.

To secure a definite and constant acid strength, an exact volume of acid, of selected specific gravity and composition, is measured onto the porous glass reservoir 22 through the opening stoppered by the stopper 24. This stopper is located at the end of tube 20 through which the breath sample is introduced in the visual determination test. The acid introduced onto the porous glass reservoir is protected at all times by good stoppers 23 and 24.

The exact volume of permanganate solution which is necessary to form the oxidizing reagent is contained in the sealed glass capillary tube 32, which is kept in a dark place until ready for use. This tube is freshly filled immediately before delivering the kit to the person making the test. The permanganate solution is discharged onto the porous glass reservoir 22 through the opening in the tube which is stoppered by stopper 23.

The alcoholic content of the breath sample being tested is maintained representative and constant by insuring a flow of the breath sample equal to, or in excess of, 800 cubic centimeters per minute. Such a flow affords a contact time sufficient for oxidizing only a small part of the alcohol content of the breath.

The capacity of the porous glass reservoir, and the volumes of acid and permanganate employed, are so selected that capillary action will hold all of the liquid against any gravitational pull tending to cause it to run out of the porous reservoir 22. But when the tube 20 is held in the vertical position prescribed for carrying out the visual determination test, with the breath sample passing in at the bottom of the tube, the liquid in the porous glass reservoir will be blown to the upper surface of the fritted glass. Here it will bubble actively in contact with the passing breath.

The composition of this layer of liquid is that resulting from the mixing of the acid blown out of the interstices in the frit and the permanganate solution, the latter having been added to the frit, just prior to the test, at this same upper surface. If the volume of breath sample passing upwardly through the frit in any given period is relatively small, for example 100 cubic centimeters per minute or less, the breath sample will flow through a few channels in the frit, leaving the acid in the other channels undisturbed. As a result the strength of the acid in the layer of liquid at the top of the reservoir will be less than when the volume of air passing through it is sufficiently great to clear all channels and blow all acid (except that wetting the walls) to the surface of the reservoir where it may mix with the permanganate solution. When the volume of air passing per minute is small the strength of acid in the colored layer will therefore be below the standard established for the test. The time required for the decolorization will therefore be greater than the normal, thus creating an error in favor of the suspect.

Moreover, if the flow of breath through the fritted glass reservoir 22 is too slow an appreciable fraction of the alcoholic content of the breath sample will be oxidized. This will mean that the concentration of alcohol in contact with the liquid reagent will not be truly representative of its concentration in the suspect's breath. Therefore, the time required to decolorize the acidic permanganate solution will also be greater than normal, thus also creating an error in the suspect's favor.

It has been found that a rate of flow for the breath sample of from 800 to 850 cubic centimeters per minute through the frits will avoid the errors enumerated. The fritted glass reservoir is therefore constructed of a porosity, and the balloon of a tension in the distended condition, such that a flow of not less than 800 cubic centimeters per minute through the fritted glass reservoir 22 is maintained.

Another possible cause of dilution of the acid strength of the permanganate reagent is through the absorption of moisture from the breath sample passing through the solution. The acid solution, at normal temperatures, has a water vapor tension somewhat lower than that of the breath as it emerges from the balloon reservoir. It therefore absorbs some moisture, thus weakening the acid. This tends to lengthen the time necessary for decolorizing the reagent, which will also create an error in the suspect's favor. This error is less for higher concentrations of alcohol, since less breath has passed at the time of decolorization and less absorption (and therefore less dilution) has occurred. In securing the most accurate results in the visual determination test a drying agent may be used, held in place at 99 in the branched tube 16 by glass wool plugs (not shown). While ordinarily not essential, the use of drying agent 99 results in reducing the vapor tension of the breath to that of the solution on the fritted glass reservoir 22, so that no gain or loss in moisture can occur. Various drying agents can be used at 99, but I have found that 0.2 gram of CaCl$_2$.2H$_2$O of particle size ranging from 8 to 10 mesh gives the best results in adjusting vapor tension without affecting the alcoholic content of the breath sample passing therethrough.

The larger the diameter of the fritted glass reservoir 22, the greater is the volume of breath necessary in order to assure constancy of breath composition as the breath sample passes through the fritted glass. Moreover, the greater the frit diameter, the greater is the volume of breath necessary to secure maximum expulsion of acid from the interstices of the frit. For practical purposes, with a flow of breath sample of approximately 800 cubic centimeters per minute, a fritted glass reservoir approximately 7 millimeters in diameter will be found to give best results.

The greater the thickness of the frit, the greater the volume of reagent that can be held in it by capillary attraction. Unfortunately, however, the greater the frit thickness the greater the air pressure required to force the desired volume of breath through it. In a similar manner the degree of fineness of the grit used in making the frit affects the amount of air pressure needed to force the breath through the frit, as well as the amount of the capillary attraction which retains the liquid reagent in place. For best results I prefer to use 0.55 gram of glass grit of 20 to 30 mesh particle size in order to secure in the finished fritted glass reservoir a rate of breath flow of approximately 800 cubic centimeters per minute.

As illustrative of the results obtained with reagents of varying concentration, when the breath sample contains 80 per cent of alveolar air and with certain strengths of colored solution, certain typical observed times required for decolorization and the corresponding percentages of alcohol in the bloodstream are tabulated below.

| Amount of Reagent | Specific Gravity | Normality of KMnO$_4$ | Time Required for Decolorization | |
|---|---|---|---|---|
| | | | Blood Alcohol Content 0.15% | Blood Alcohol Content 0.05% |
| cc. | | | seconds | seconds |
| 0.10 | 1.224 | 0.02 | 55 | 115 |
| 0.10 | 1.240 | 0.02 | 40 | 80 |
| 0.10 | 1.264 | 0.02 | 25 | 50 |

Reagents of specific gravity ranging from 1.160 to 1.290, and potassium permanganate concentrations ranging from 0.005 normal to 0.100 normal, will be found to give the best results in my visual determination method. When the normality of the potassium permanganate solution is high, with acid specific gravities toward the lower part of the range specified, the decolorization end point is somewhat interfered with by the appearance of a brown colorization. On the other hand, the stronger normalities give a deeper initial color, with correspondingly greater color change as decolorization proceeds. The normality of the potassium permanganate solution to be employed should be selected in accordance with the strength of acid employed.

It should be understood that various changes and modifications may be made in my method, as herein described in a preferred form, without departing from the spirit or scope of my invention. Similarly, various changes or variations may be made in the form of apparatus described in connection with the improved embodiment of my invention without departing from the scope thereof. It is my intention that these changes, modifications, and variations, to the extent that they are within the purview of the appended claims, shall be considered as part of my invention.

I claim:

1. The method of rapidly ascertaining the approximate degree of intoxication of a person which comprises forcing exhaled alveolar air of the person undergoing test at a flow rate of at least 800 cubic centimeters per minute through a colored acidic solution of potassium permanganate having a potassium permanganate concentration falling within the range 0.005 N to 0.100 N and a specific gravity falling within the range 1.16 to 1.29, said solution being contained within the interstices of a porous glass frit, and measuring the period of time required to render said colored acidic solution colorless, said period of time being proportional to the blood alcohol content and degree of intoxication of the person undergoing test.

2. In the method of testing the alcohol-containing breath of a person in order to accurately determine his degree of intoxication wherein a sample of exhaled alveolar air of the person undergoing test is passed through absorbent tubes which absorb, in separate tubes, the alcohol and carbon dioxide contents present in said sample of breath and the amounts of said alcohol and carbon dioxide, separately absorbed, are then accurately determined, the step of first forcing exhaled alveolar air of the person undergoing test at a flow rate of at least 800 cubic centimeters per minute through colored acidic solution of potassium permanganate having a potassium permanganate concentration falling within the range 0.005 N to 0.100 N and a specific gravity falling within the range 1.16 to 1.29, said solution being contained within the interstices of a porous glass frit, and measuring the period of time required to render said colored acidic solution colorless, said period of time being proporitonal to the blood alcohol content and degree of intoxication of the person undergoing test, thus rapidly securing an approximately value for the degree of intoxication of said person in advance of said accurate determination by separate absorption of said alcohol and carbon dioxide in another sample of said person's exhaled alveolar breath.

GLENN C. FORRESTER.

REFERENCES CITED

The following references are of record in the file of this patent:

UNITED STATES PATENTS

| Number | Name | Date |
| --- | --- | --- |
| 1,641,817 | Knipping | Sept. 6, 1927 |
| 2,062,785 | Harger | Dec. 1, 1936 |
| 2,103,136 | Bangert | Dec. 21, 1937 |
| 2,141,646 | Ferguson | Dec. 27, 1938 |
| 2,153,568 | Johnson | Apr. 11, 1939 |

OTHER REFERENCES

Bogen, "A Quantitative Study of Acute Alcoholic Intoxication," American Journal of the Medical Sciences, August 1928, pages 157–160.

Harger et al., "A Rapid Chemical Test for Intoxication Employing Breath," J. Am. Med. Association, vol. 110, pages 779–785 (1938).

Jetter et al., "The Perchlorate Method for Determining Concentration of Alcohol in Expired Air as a Medicolegal Test," Archives of Pathology, vol. 32, pages 828–842 (1941).

Jetter et al., "A New Method for the Determination of Breath Alcohol," Am. J. Path. Tech. Suppl., vol., 5, pages 75–88 (1941).

Fabre et al., Bull. Soc. Chim. Biol. vol 26, pages 49–56 (1946).